(No Model.)
J. Y. LEWIS.
HEIGHT MEASURING DEVICE.
No. 442,192.  Patented Dec. 9, 1890.
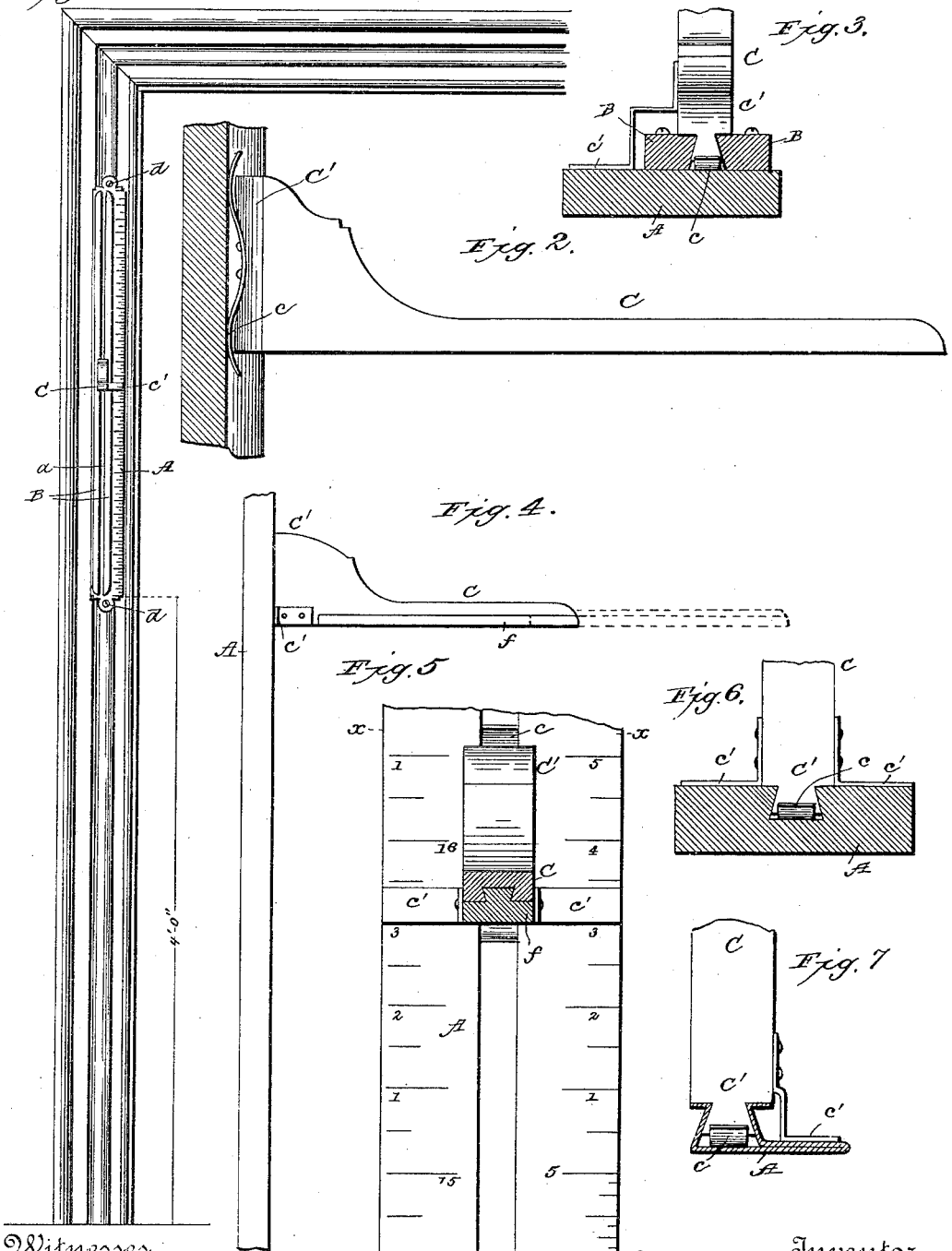
Witnesses:
E. D. Smith
Alex J. Stewart
Inventor
James Y. Lewis,
By his Attorneys
Church & Church

UNITED STATES PATENT OFFICE.

JAMES Y. LEWIS, OF QUINCY, ILLINOIS.

HEIGHT-MEASURING DEVICE.

SPECIFICATION forming part of Letters Patent No. 442,192, dated December 9, 1890.

Application filed May 24, 1890. Serial No. 353,071. (No model.)

*To all whom it may concern:*

Be it known that I, JAMES Y. LEWIS, of Quincy, in the county of Adams and State of Illinois, have invented certain new and useful Improvements in Height-Measuring Devices; and I do hereby declare the following to be a full, clear, and exact description of the same, reference being had to the accompanying drawings, forming a part of this specification, and to the letters of reference marked thereon.

This invention has for its object to provide a convenient and economical device for readily determining the height of persons or animals, which may be quickly and easily placed in position upon the door-casing or other convenient support, or may be used with staff-support and made portable, whereby it is adapted particularly for use in recruiting, physicians' life-insurance examining, and pension-examiners' offices, or in a livery or sales stable, or by farmers and stock-raisers where it is desired to measure the height of animals.

The invention consists of a measuring device or instrument having certain novel details of construction and combinations and arrangements of parts, to be hereinafter described, and pointed out particularly in the claims at the end of this specification.

In the accompanying drawings, Figure 1 is a front elevation of the preferred form of instrument constructed in accordance with my invention applied to a door-casing. Fig. 2 is an enlarged vertical sectional view of the same. Fig. 3 is a horizontal section taken immediately above the horizontal measuring-arm. Fig. 4 is a side elevation of a modified form of the instrument. Fig. 5 is a front elevation of the same, showing the measuring-arm in section. Fig. 6 is a section on line $x\ x$, Fig. 5. Fig. 7 is a section of a modified form of base-piece.

Like letters of reference in the several figures denote the same parts.

I preferably form the main portion of the instrument of wood, A indicating the base, consisting of a flat piece with a groove $a$ therein, preferably formed by securing two strips or one dovetailed strip B B to the face of the base-piece by glue, screws, or otherwise, said strips having their proximate faces undercut, as shown. A measuring-arm C is adapted to slide up and down the base, being retained in horizontal and adjusted position by means of its head-piece C', which works in and conforms approximately in shape to the shape of the groove in the base, and has a flat curved spring $c$ attached thereto for holding the arm out and creating friction between the arm and base. The base is provided along one or both edges with a scale indicating the number of feet from the floor or pavement, and the arm is provided with a pointer or finger $c'$ at one side, which indicates the exact level of the lower straight surface of the arm.

In practice I design to make the whole base but about two feet six inches long, as this is sufficient to allow for the usual maximum or minimum height of either man or animal, and attach the same to the door or window-casing, wall, central post, or other convenient staff-support, with the bottom line of the scale exactly four feet from the floor or pavement surface, the said bottom line of course being marked four feet, and hence the scale runs from this up to six feet six inches. The base may be secured in place by screws $d$ at top and bottom, as shown, or any other well-known or preferred fastening may be employed.

The modified form of instrument shown in Figs. 4, 5, and 6 is intended as a combined horse and man measure, being for this purpose provided with a scale of feet on one side and a horse-measure or hand-measure scale on the other side, pointers being employed on both sides of the measuring-arm. The groove in this instance is formed directly in the body of the base-piece by a channeling dovetailer-machine, or otherwise, as will be readily understood, and the measuring-arm is made extensible, the section $f$ forming the lower surface being united to the upper portion by a dovetail spline and groove, which permits it to move straight out, but will not permit it to be distorted in the least without an actual breakage of the parts. With this arrangement it will be seen that a horse can be brought alongside of the measuring-instrument, or the instrument on staff taken to the horse and the extended arm brought down on his back, at once indicating his height in hands and also in feet and inches. The inner face of the head to which the spring is attached is concaved or curved, and the spring is curved correspondingly, only in a more exaggerated degree, so as to bear with an even regular pressure on the bottom of the groove, but will not permit the arm to move to a perceptible degree from the horizontal, and any such movement is at once corrected by the spring. In moving the measuring-arm it will usually be found that it slides readily; but if it should not a slight inward pressure at once frees the head by reason of the peculiar shape of the groove, and then no difficulty will be experienced in moving it to any desired position.

It will be understood that other materials than wood may be employed in the manufacture of the present scale-measure—as, for instance, the base may be made of sheet metal, heavy paper, and many other substances—with the edges bent over to form the dovetail groove, as indicated in the section, Fig. 7, and other modifications obvious to those skilled in the art may be made without departing from the spirit of the invention.

Having thus described my invention, what I claim as new is—

1. In a height-measuring instrument, the combination, with the vertical hanging base adapted to be secured to a door-casing or similar support and having the dovetail groove therein and the scale at the side, of the horizontal measuring-arm having the head fitting in and approximately conforming to the shape of the groove, and the pointer or indicator for indicating the height of the lower surface of the measuring-arm, substantially as described.

2. In a height-measuring instrument, the combination, with the vertical hanging base adapted to be secured to a door-casing or other support and having the dovetail groove therein and the scale at the side, of the horizontal measuring-arm having the head fitting in and approximately conforming to the shape of the groove, the friction-spring on the face of the head bearing against the bottom of the groove, and the pointer or indicator for indicating the height of the lower surface of the arm, substantially as described.

3. In a height-measuring instrument, the combination, with the base having the groove therein, of the measuring-arm sliding therein and having the extensible section, whereby the length of the arm may be increased, substantially as described.

4. In a height-measuring instrument, the combination, with the base having the groove therein and adapted to be secured to the door-casing or other support, of the measuring-arm having the head fitting in said groove, and the removable lower section of the arm united thereto by a dovetail spline and groove, substantially as described.

JAMES Y. LEWIS.

Witnesses:
L. E. EMMONS,
L. E. EMMONS, Jr.